United States Patent
Kresse et al.

(10) Patent No.: US 7,447,552 B2
(45) Date of Patent: Nov. 4, 2008

(54) COMMON TRANSMISSION PROTOCOL SYSTEM FOR AN AUTOMATION DEVICE

(75) Inventors: Heiko Kresse, Obernkirchen (DE); Andreas Stelter, Minden (DE); Ralf Schaeffer, Hille (DE)

(73) Assignee: ABB Patent GmbH, Ladenburg (DE)

( * ) Notice: Subject to any disclaimer, the term of this patent is extended or adjusted under 35 U.S.C. 154(b) by 202 days.

(21) Appl. No.: 11/516,951

(22) Filed: Sep. 7, 2006

(65) Prior Publication Data

US 2007/0126498 A1    Jun. 7, 2007

(30) Foreign Application Priority Data

Sep. 13, 2005    (DE) .................. 10 2005 043 489

(51) Int. Cl.
*G05B 11/32* (2006.01)
*G05B 19/18* (2006.01)
*G06F 3/00* (2006.01)
*H03C 3/00* (2006.01)

(52) U.S. Cl. .................. 700/2; 700/67; 710/1; 332/100

(58) Field of Classification Search ......... 332/100–102; 700/1, 2, 4, 7, 67, 73; 341/126, 144, 153, 341/154; 710/1, 62, 65, 69
See application file for complete search history.

(56) References Cited

U.S. PATENT DOCUMENTS

| 4,549,044 A | * | 10/1985 | Durham ................. 379/40 |
| 5,233,642 A | | 8/1993 | Renton |
| 6,278,357 B1 | * | 8/2001 | Croushore et al. ........ 375/259 |
| 6,307,490 B1 | | 10/2001 | Litfin |

* cited by examiner

*Primary Examiner*—David Mis
(74) *Attorney, Agent, or Firm*—Michael M. Rickin; Michael G. Prewitt

(57) ABSTRACT

An automation device is disclosed, in which a multiplicity of physically distributed functional units communicate with each other by means of a common transmission protocol. The device has a microcontroller (110), which has a group of associated input/output connections which are connected to a resistor network. The resistances of the resistors follow a sequence, the resistance respectively being doubled from the less significant to the next most significant bit. Each input/output connection is actively switched to the associated logic level in order to output a first logic state and is connected as a high-impedance input in order to output the inverse, second logic state.

1 Claim, 2 Drawing Sheets

COMMON TRANSMISSION PROTOCOL SYSTEM FOR AN AUTOMATION DEVICE

CROSS REFERENCE TO RELATED APPLICATION

This application claims priority from German Application DE 10 2005 043 489.4 filed on Sep. 13, 2005 the contents of which are relied upon and incorporated herein by reference in their entirety, and the benefit of priority under 35 U.S.C. 119 is hereby claimed.

BACKGROUND OF THE INVENTION

The invention relates to an automation device, with which a multiplicity of physically distributed functional units communicate with each other by means of a common transmission protocol. These functional units manifest themselves as field devices or operator units according to their automation function.

For some time now it has been common practice in instrumentation and control engineering to use a two-wire line to supply a field device and to transfer measurements from this field device to a display device and/or to an automation control system, or transfer control values from an automation control system to the field device. Each measurement or control value is converted into a proportional DC current, which is superimposed on the DC supply current, where the DC current representing the measurement or control value can be a multiple of the DC supply current. Thus the supply current consumption of the field device is usually set to approximately 4 mA, and the dynamic range of the measurement or control value is mapped onto currents between 0 and 16 mA, so that the known 4 to 20 mA current loop can be used.

More recent field devices also feature universal properties that are largely adaptable to the given process. For this purpose, an AC transmission path capable of bi-directional operation is provided in parallel with the unidirectional DC transmission path, via which parameterization data are transferred in the direction to the field device and measurements and status data are transferred from the direction of the field device. The parameterization data and the measurements and status data are modulated on an AC voltage, preferably frequency modulated.

In process control engineering, it is common in the field area as it is called, to arrange and link field devices, i.e. measurement, control and display modules, locally according to the specified safety requirements. These field devices have analog and digital interfaces for data transfer between them, where data transfer takes place via the supply lines of the power supply arranged in the control area. Operator units are also provided in the control area, as it is called, for controlling and diagnosing these field devices remotely, where lower safety requirements normally apply.

Data transfer between the operator units in the control area and the field devices is implemented using FSK modulation (Frequency Shift Keying) superimposed on the known 20 mA current loops, where two frequencies, assigned to the binary states "0" and "1", are transferred in frames as analog signals.

The general conditions for the FSK signal and the type of modulation are specified in the "HART Physical Layer Specification Revision 7.1-Final" dated 20 Jun. 1990 (Rosemount Document no. D8900097; Revision B).

ASICs specifically developed to implement the FSK interface according to the HART protocol, such as the HT2012 from the SMAR company, are commercially available and in common use. The disadvantage with these special circuits is the permanently fixed range of functions and the associated lack of flexibility to adapt to changing requirements.

Known modern automation devices are usually equipped with a processing unit known as a microcontroller, which is used to perform the correct data processing for the automation task of the functional unit concerned.

The aim is to reproduce the functions of the FSK interface according to the HART protocol in the controller of the processing unit of the automation devices, without impairing in the process the automation task of the functional unit concerned.

Hence the object of the invention is specifically to define means for converting a quantized binary signal which reproduces a data bit-stream into a periodic FSK signal using a microcontroller known per se.

SUMMARY OF THE INVENTION

The invention is based on an automation device having a microcontroller, which is assigned at least one clock generator and one memory unit for storing instructions and data. This microcontroller is connected at least to one data source, which is designed to output a data bit-stream to be transmitted, and to one data sink, designed to accept a received data bit-stream. The data bit-stream to be transmitted is converted into a sequence of successive binary-coded samples of a periodic FSK signal.

In this case, provision may be made for the successive samples to be stored in a table which is stored in the memory unit such that it can be called up.

The microcontroller has a plurality of input/output connections, at least some of which are combined to form groups. These groups are referred to as ports. A port denotes a group of associated input/output connections which can be addressed together, said group being matched to the processing width of the microcontroller. The number of input/output connections of a port regularly corresponds to the number of bits which can be simultaneously processed.

Connected to such a group of input/output connections is a resistor network comprising a plurality of resistors whose respective first connection is connected to one of the input/output connections and whose respective second connections are connected together and are connected to an input of an amplifier. The resistances follow a sequence m*R, where $1 \leq m \leq n$ and where n is the number of input/output connections which have been connected and m is the ordinal number of the respective input/output connection beginning with m=1 for the LSB.

The successive binary-coded samples of the periodic FSK signal are output to the resistor network via the group of input/output connections. In order to output each logic state, the respective input/output connection is actively switched to the associated logic level. As a result, resistors in the megohm range can be used. Consequently, the flow of current is reduced to a circuitry-dependent minimum.

A device which is designed in this manner is advantageously distinguished by a low power requirement. An automation device which is equipped in this manner is particularly suitable for remote-supply and battery-powered devices.

In a further refinement of the invention, a filter is connected downstream of the amplifier. The successive voltage levels which are suitable for the samples are thus converted into a closed time profile of a frequency-modulated line signal.

BRIEF DESCRIPTION OF THE DRAWING

The invention is explained in more detail below with reference to an exemplary embodiment. In the drawings required for this.

DETAILED DESCRIPTION OF ILLUSTRATIVE EMBODIMENTS

Figure 1:
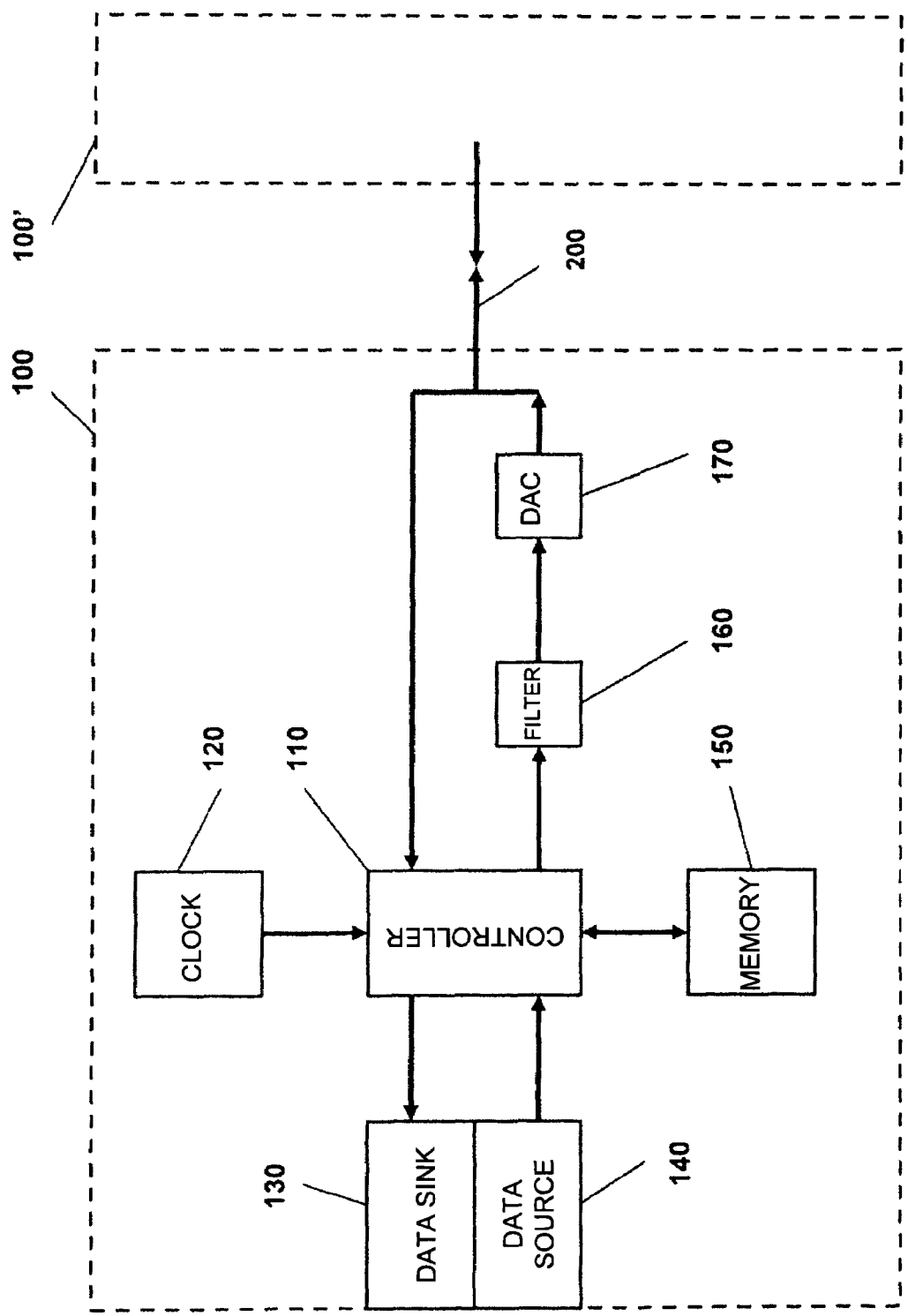
FIG. 1 shows a block diagram of an automation device

FIG. 1 shows schematically an automation device 100 to the extent necessary to understand the present invention.

The automation device 100 is connected via a communications line 200 to an automation device 100' of substantially the same type. The communications line 200 is used bi-directionally. The information sent by the automation device 100 is received by the automation device 100', and vice versa. Hence reference is only made below to the automation device 100 shown in detail.

A core component of the automation device 100 is a controller 110, which is connected at least to one memory unit 150 and one timing element, referred to below as a clock generator 120 for the sake of simplicity. Usually, however, parts of the clock generator 120 are already implemented in the controller 110.

The controller 110 has connections for connecting a data sink 130 and a data source 140.

A configurable and/or parameterizable sensor for converting a physical variable into an electrical variable can be provided as the data source 140, in which case the configuration and/or parameterization is the data sink 130.

In an alternative embodiment, it can be provided that the data sink 130 is an actuator for converting an electrical variable into a physical variable whose properties can be diagnosed. The diagnostic device provided for this purpose is then the data source 140.

In a further embodiment, it can be provided that the automation device 100 is part of a higher-level device designed for bi-directional communication with additional automation devices 100'. In this embodiment, the higher-level device is both the data source 140 and the data sink 130.

In a further embodiment, the automation device 100 can be designed as a "protocol converter". In this embodiment, the data source 140 and the data sink 130 are formed by a second communications system.

To implement the invention, however, it is sufficient for the data source 140 to be present without the data sink 130.

In addition, connected to the controller 110 is a digital-to-analog converter 160 whose output is connected to a filter 170. The output of the filter 170 is connected to the communications line 200. In addition, the communications line 200 is taken to the input terminals of the controller 110, via which terminals it is provided that the line signal on the communications line 200 is received.

The controller 110 is assigned a first program for converting a data bit-stream to be transmitted into a sequence of samples of a suitable frequency-modulated line signal. In addition, the controller 110 is assigned a second program for detecting a frequency-modulated line signal and for sequentially converting the latter into a received data bit-stream. The first and second programs are stored in the memory 150 such that they can be called up. The first and second programs can be alternately executed.

The data bit-stream which is to be transmitted and is kept ready in the data source 140 is read into the controller 110 in quantized form. Depending on the logic value of each bit to be transmitted, a sequence of successive samples at a first or a second frequency is output. In this case, the first frequency represents a logic zero and the second frequency represents a logic one.

To this end, provision may be made for the successive samples to be stored in a table which is stored in the memory 150 such that it can be called up.

In a further refinement of the invention, a digital-to-analog converter 160 is connected to the transmission side of said controller 110, a filter 170 being connected downstream of said digital-to-analog converter 160. The successive samples are thus converted into a closed time profile of a frequency-modulated line signal and are output to the communications line 200.

Figure 2:
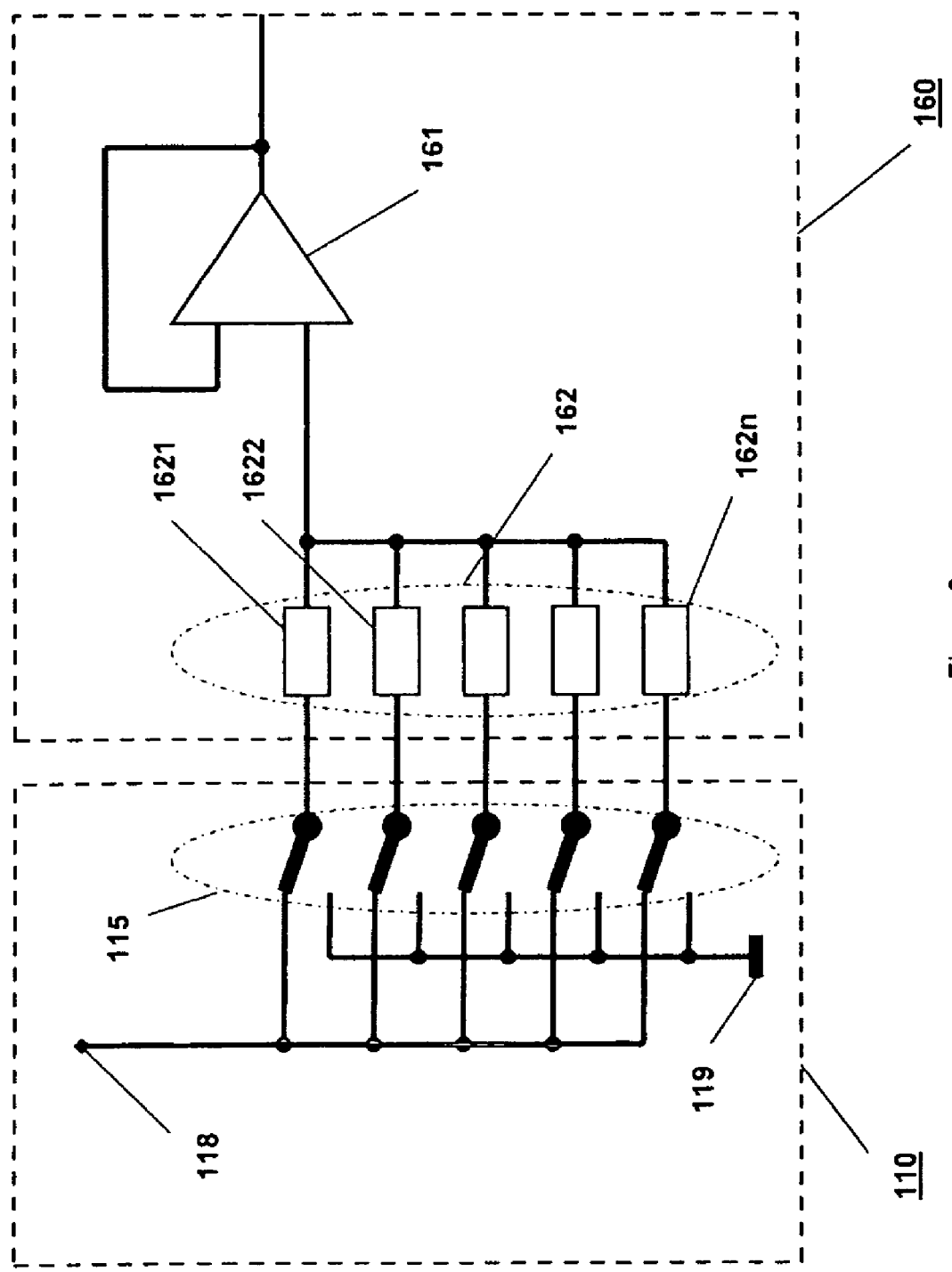
FIG. 2 shows a schematic diagram of digital-to-analog conversion

FIG. 2 uses a basic circuit diagram to illustrate the principle of digital-to-analog conversion. The controller 110 has input/output connections which are combined to form a group. This group is referred to as port 115 below. The input/output connections of a port 115 can be addressed together and are matched to the processing width of the microcontroller. FIG. 2 illustrates only those connections which are essential to the invention, irrespective of the number of input/output connections of a port 115.

Connected to the port 115 is a resistor network 162 comprising a plurality of resistors 1621 to 162$n$ whose respective first connection is connected to one of the port connections and whose respective second connections are connected together and are connected to an input of an amplifier 161. The resistances follow a sequence m*R, where $1 \leq m \leq n$ and where m is the number of port connections which have been connected and n is the ordinal number of the respective port connection beginning with m=1 for the LSB. According to this, the ordinal number m=1 is at the port connection for outputting the LSB and the resistance of the connected resistor 1621 is R. The resistor 1622 which is connected to the port connection for the next most significant bit with the ordinal number m=2 has twice the resistance 2R of the resistor 1621 at the port connection for outputting the LSB. This sequence continues until the port connection for outputting the MSB which is characterized by the ordinal number m=n and to which the resistor 162$n$ is connected. The resistor 162$n$ has n times the resistance n*R of the resistor 1621 at the port connection for outputting the LSB.

The successive binary-coded samples of the periodic FSK signal are output to the resistor network 162 via the port connections.

In order to output each logic state, the respective port connection is actively switched to the associated logic level. In order to output a logic one, the port connection is connected to the level of the operating voltage at the operating voltage connection 118. In order to output a logic zero, the port connection is connected to the ground level at the ground connection 119. As a result, resistors having a very high resistance in the megohm range can be used for the resistor network 162. Consequently, the flow of current is reduced to a circuitry-dependent minimum.

What is claimed is:

1. An automation device, with which a multiplicity of physically distributed functional units communicate with each other by means of a common transmission protocol, having a microcontroller, which is assigned at least one clock generator and one memory unit, and which is connected at least to one data source, which is designed to output a data bit-stream to be transmitted, and to one data sink, designed to accept a received data bit-stream, characterized in that connected to a group (115) of associated input/output connections (which can be addressed together) of the microcontroller (110) is a resistor network (162) comprising a plurality of resistors (1621 to 162*n*) whose respective first connection is connected to one of the input/output connections and whose respective second connections are connected together and are connected to an input of an amplifier (161), the resistances of the resistors (1621 to 162*n*) follow a sequence n*R, where $1 \leq m \leq n$ and where n is the number of input/output connections which have been connected and m is the ordinal number of the respective input/output connection beginning with m=1 for the LSB, and each input/output connection is actively switched to the associated logic level in order to output each logic state.

\* \* \* \* \*